United States Patent
Tojo et al.

(10) Patent No.: US 8,971,585 B2
(45) Date of Patent: *Mar. 3, 2015

(54) IMAGE PROCESSING APPARATUS FOR RETRIEVING OBJECT FROM MOVING IMAGE AND METHOD THEREOF

(71) Applicant: Canon Kabushiki Kaisha, Tokyo (JP)

(72) Inventors: Hiroshi Tojo, Fuchu (JP); Hidetomo Sohma, Yokohama (JP); Satoshi Yashiro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,235

(22) Filed: Jan. 16, 2013

(65) Prior Publication Data

US 2013/0129157 A1  May 23, 2013

Related U.S. Application Data

(63) Continuation of application No. 12/491,588, filed on Jun. 25, 2009, now Pat. No. 8,379,931.

(30) Foreign Application Priority Data

Jun. 27, 2008 (JP) ................. 2008-169592

(51) Int. Cl.
| | |
|---|---|
| G06K 9/62 | (2006.01) |
| G06K 9/00 | (2006.01) |
| G11B 27/28 | (2006.01) |
| G11B 27/32 | (2006.01) |
| H04N 5/77 | (2006.01) |
| H04N 5/765 | (2006.01) |
| H04N 9/82 | (2006.01) |

(52) U.S. Cl.
CPC .............. *G06K 9/00* (2013.01); *G06K 9/00295* (2013.01); *G11B 27/28* (2013.01); *G11B 27/322* (2013.01); *H04N 5/772* (2013.01); *H04N 5/765* (2013.01); *H04N 9/8205* (2013.01); *H04N 9/8227* (2013.01)
USPC .......................................... 382/107; 382/118

(58) Field of Classification Search
None
See application file for complete search history.

(56) References Cited

U.S. PATENT DOCUMENTS

| 8,379,931 B2* | 2/2013 | Tojo et al. ................ 382/107 |
| 2006/0152587 A1* | 7/2006 | Kondo et al. ............. 348/207.99 |
| 2007/0162873 A1* | 7/2007 | Haro et al. ................ 715/838 |

* cited by examiner

*Primary Examiner* — Brian P Werner
(74) *Attorney, Agent, or Firm* — Canon U.S.A., Inc. IP Division (57) ABSTRACT

A face image is detected for each frame at a predetermined interval in moving image data, and the face image is traced using a frame in which the face image is detected and frames subsequent to the frame. A face sequence including an interval in which the face can be traced and motion velocity vectors of the face indicating a change in the position of the face image in the interval is generated based on the tracing result. Further, camera operation information about when the moving image data is acquired is generated from the frame image of the moving image data. When there is an overlap in the plurality of intervals in which the face images are traced, the face being tracked by the camera is determined using the face sequence and the camera operation information of each of the plurality of face images. The face determined to be tracked is then determined to be a key object.

6 Claims, 11 Drawing Sheets

IMAGE PROCESSING APPARATUS FOR RETRIEVING OBJECT FROM MOVING IMAGE AND METHOD THEREOF

This application is a continuation application of U.S. patent application Ser. No. 12/491,588 filed Jun. 25, 2009, which claims priority from Japanese Patent Application No. 2008-169592 filed Jun. 27, 2008, which are hereby incorporated by reference herein.

BACKGROUND OF THE INVENTION

1. Field of the Invention

The present invention relates to an image processing apparatus and an image processing method suitable for use in retrieving a predetermined object from a moving image.

2. Description of the Related Art

Conventionally, there is a technique which reproduces a moving image corresponding to an interval (period) in which a desired object is captured. In such a technique, the moving image can be reproduced by retrieving the predetermined object from a moving image, and setting the frame image containing the object as a representative image.

For example, Japanese Patent Application Laid-Open No. 2001-167110 discusses a technique which detects a shot (scene) change and then detects a face from the headmost frame of each shot. The technique sets the frame in which the face is detected as the representative image. The technique also identifies attributes of the face, such as orientation, size, and number of the faces, gender, race, and the name of the person, and the attributes can be designated as conditions of the representative image.

Further, Japanese Patent No. 3312105 discusses a technique which detects the face from the frame and then calculates an evaluation value using the size and the number of the detected faces and the distance from the center of the frame to the detected face. The frame with the greatest or the least evaluation value is thus set as the representative image.

However, according to the above-described conventional techniques, no distinction is made on whether the retrieved object is an object that the user intended to capture (hereinafter, such an object will be referred to as a key object as necessary). As a result, it is difficult to search for the interval (time period) in which the key object is captured.

More specifically, when a list of representative images configured of the frame images containing the object is provided to the user, the list includes both the key object and other objects. It is thus necessary for the user to first distinguish the key object from the other objects. Further, when generating a digest including only the intervals in which the object is present, the digest tends to include both the intervals in which the key object is present and the intervals in which the other objects are present.

The above-described technique discussed in Japanese Patent Application Laid-Open No. 2001-167110 can acquire the representative image matching the face attributes (i.e., size, number, gender, race, and name). However, such attributes are not related to whether the user purposely or accidentally captured the scene. Therefore, the face of an object that is not the key object may be selected as the representative image.

Further, in the technique discussed in Japanese Patent No. 3312105, the representative image containing the key object can be acquired if the object is one person captured at the center of the frame, for example, when taking a close up of the object. However, when a plurality of objects including the key object and the other objects is captured at the same time, the faces of both the key object and the other objects are contained in the representative image.

Figure 9A:
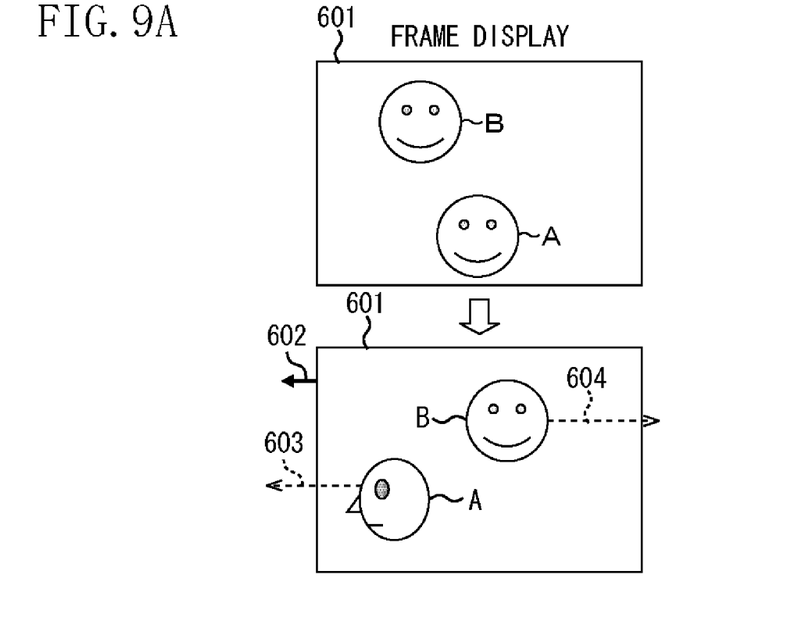
FIGS. 9A and 9B illustrate examples of motions of objects in a frame display and the actual motions of the objects according to the first exemplary embodiment of the present invention.
Figure 9B:
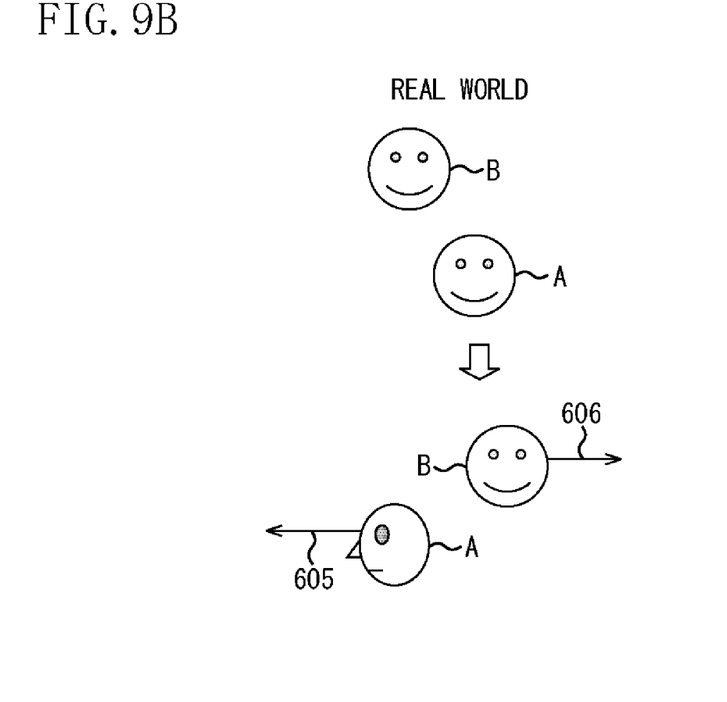

FIGS. 9A and 9B illustrate examples of motions of the objects within a frame display (FIG. 9A) and the actual motions of the objects (FIG. 9B).

Referring to FIGS. 9A and 9B, objects A and B are captured. However, the object A is purposely captured by the user, and the object B only happens to be in the frame.

In the example illustrated in FIG. 9A, the object A and the object B are proximately at an equal distance from the video camera, and the sizes of the faces of the object A and object B are proximately similar. Further, the object A is moving towards the left side in the drawing, and the object B is stationary or moving towards the right side in the drawing. Therefore, as time lapses, the object A goes out of the frame, so that the user pans the video camera to the left. As a result, the face of the object B passes through the center of a frame display 601 and moves towards the right side. Therefore, according to the technique discussed in Japanese Patent No. 3312105, the evaluation value of the face of the object B which is not the key object becomes high, so that the object which is not the key object is extracted as the representative image.

SUMMARY OF THE INVENTION

The present invention is directed to ensuring the key object to be retrieved from the moving image.

According to an aspect of the present invention, an image processing apparatus includes an input unit configured to input a moving image, a detection unit configured to detect an object from a moving image input by the input unit, a tracing unit configured to trace an object detected by the detection unit from a moving image input by the input unit and acquire motion of the object and a moving image interval in which the object is present in the moving image based on a tracing result, and a key object determination unit configured to determine, when there is an overlap in moving image intervals acquired by the tracing unit for a plurality of objects, whether each object is a key object based on motion of each of the plurality of objects.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings. It is to be noted that the relative arrangement of the components, the numerical expressions, and numerical values set forth in these embodiments are not intended to limit the scope of the present invention.

Figure 1:
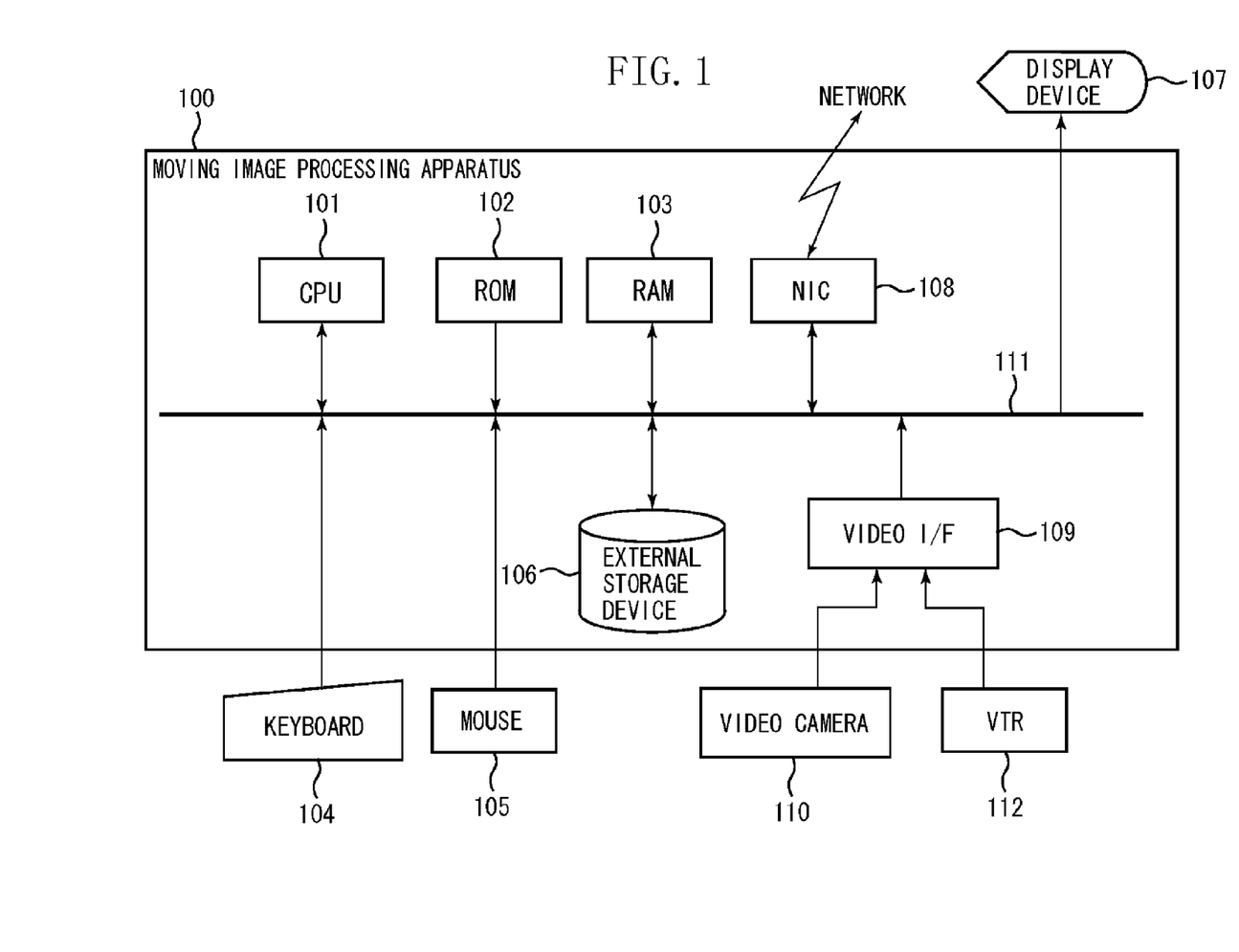
FIG. 1 is a block diagram illustrating an example of a control configuration of a moving image processing apparatus according to a first exemplary embodiment of the present invention.

FIG. 1 is a block diagram illustrating an example of the control configuration of the moving image processing apparatus according to the first exemplary embodiment of the present invention.

Referring to FIG. 1, a central processing unit (CPU) 101 performs various control in a moving image processing apparatus 100. A read-only memory (ROM) 102 stores various data and a boot program executed when the moving image processing apparatus 100 is activated. A random access memory (RAM) 103 stores control programs to be executed by the CPU 101 and provides a work area for the CPU 101 to perform various control. A keyboard 104 and a mouse 105 provide various input operation environments for the user.

An external storage device 106 includes hard disk, flexible disk, optical disk, magnetic disk, optical magnetic disk, and magnetic tape. A display device 107 includes a liquid crystal display (LCD) and displays a process result to the user. The moving image processing apparatus 100 can communicate with other external devices connected to a network via a network interface 108. Further, moving image processing apparatus 100 can retrieve the moving image data from a video camera 110 or a video tape recorder (VTR) 112 via a video interface (I/F) 109. A bus 111 interconnects each of the above-described components to be communicable with each other.

In the configuration illustrated in FIG. 1, the video camera 110, the VTR 112 and the external storage device 106 can be connected to (disposed on) the network.

Figure 2:
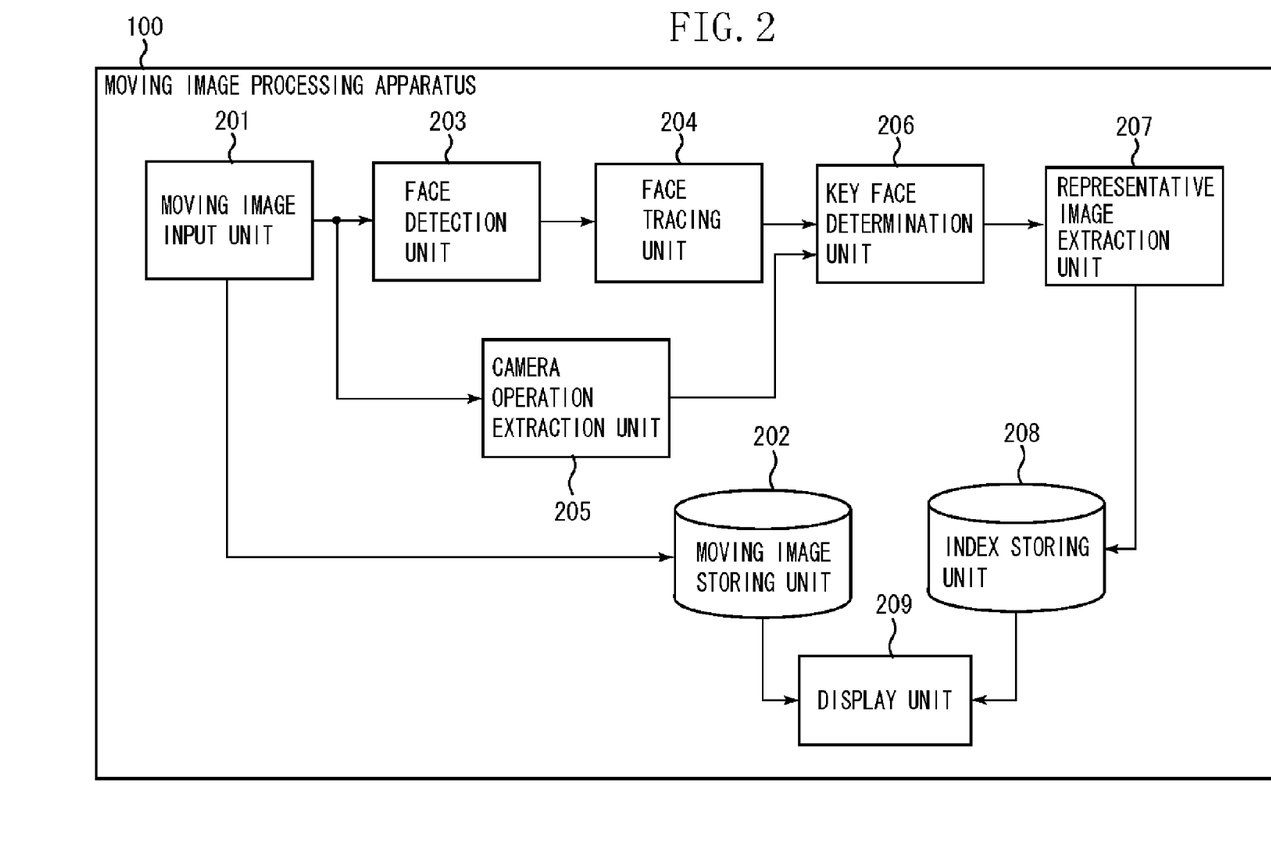
FIG. 2 is a block diagram illustrating an example of a functional configuration of the moving image processing apparatus according to the first exemplary embodiment of the present invention.

FIG. 2 is a block diagram illustrating an example of the functional configuration of the moving image processing apparatus 100.

Referring to FIG. 2, a moving image input unit 201 acquires the moving image data from the video camera 110 and the VTR 112 via the video I/F 109 and inputs the acquired moving image data to a moving image storing unit 202. The moving image data acquired by the moving image input unit 201 is recorded in the moving image storing unit 202 as a moving image file. The moving image input unit 201 may acquire the moving image stored in the external storage device 106 or in an external device connected to the network which can access the moving image processing apparatus 100 from the outside via the NIC 108. In such a case, it is not necessary to store again the moving image file acquired by the moving image input unit 201 in the external storage device 106.

A face detection unit 203 detects the human face pattern from a predetermined frame in the moving image data acquired by the moving image input unit 201. The face detection unit 203 then outputs the detected result to a face tracing unit 204.

The face tracing unit 204 traces the human face pattern detected by the face detection unit 203 in a frame subsequent to the frame in which the human face pattern is detected. The face detection unit 204 then outputs to a key face determination unit 206 a face sequence acquired as a result of tracing the human face pattern. The face sequence includes an interval (period) in which the face is present and the information about motion velocity vectors of a face region inside the frame display.

A camera operation extraction unit 205 determines a content of a user operation in an image capturing apparatus (e.g., a video camera), such as panning and tilting, performed when the user captures an image using the image capturing apparatus. The image capturing apparatus information is determined from the frame image in the moving image data acquired by the moving image input unit 201. The camera operation extraction unit 205 then generates the camera operation information indicating the determined result and outputs the camera operation information to the key face determination unit 206.

The key face determination unit 206 determines the sequence of the face that is the key object, based on the face sequence output from the face tracing unit 204 and the camera operation information output from the camera operation extraction unit 205. The key face determination unit 206 then outputs the determined face sequence to a representative image extraction unit 207.

The representative image extraction unit 207 extracts the image representing the moving image data (hereinafter referred to as a representative image as necessary) from the moving image data acquired by the key face determination unit 201. The representative image is extracted based on the sequence of the face that is the key object, output from the key face determination unit 206. The representative image extraction unit 207 then associates the extracted image with the interval in which the face that is the key object is present, in the face sequence output from the key face determination unit 206. The representative image extraction unit 207 then stores the associated information in an index storing unit 208 as index information.

A display unit 209 reads out the index information from the index storing unit 208 and displays the index information on the display device 107. The display unit 209 then reproduces and displays the moving image of the interval in which the face that is the key object is present, from the moving image file stored in the moving image storing unit 202. The display unit 209 reproduces and displays the moving image according to a user's instruction acquired via the keyboard 104 or the mouse 105.

Figure 3:
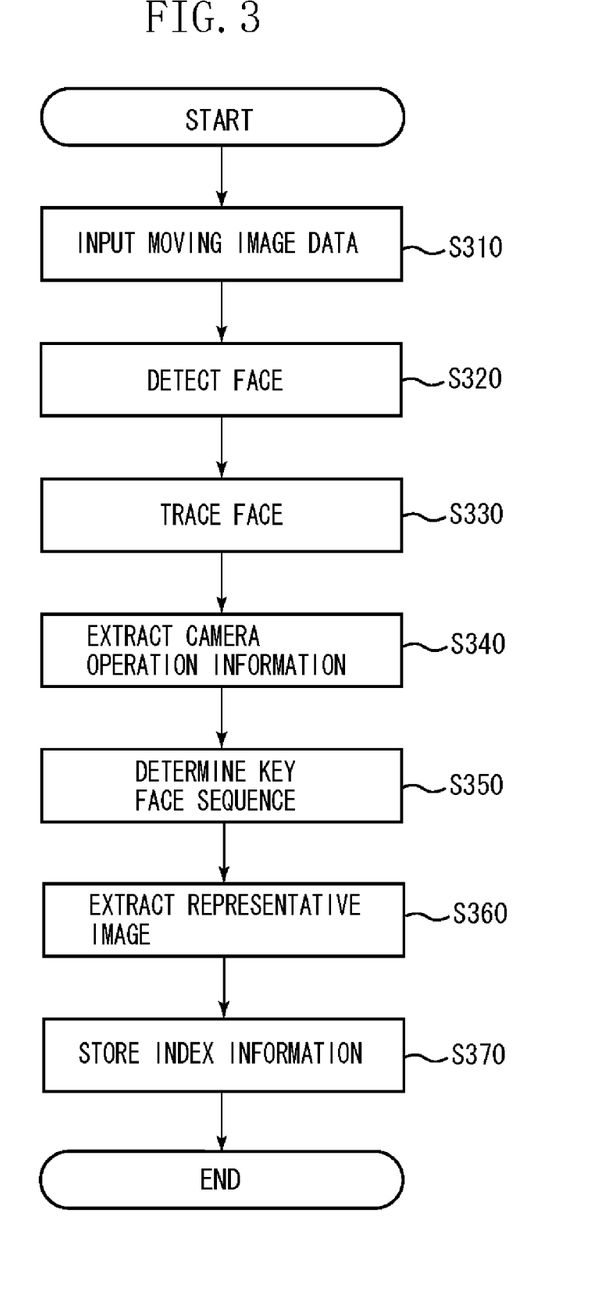
FIG. 3 is a flowchart illustrating an example of a process of acquiring moving image data and storing index information according to the first exemplary embodiment of the present invention.

An example of a process performed by the moving image processing apparatus 100 including acquisition of the moving image data and storing the index information will be described below with reference to the flowchart illustrated in FIG. 3.

In step S310, the moving image input unit 201 inputs the moving image data desired by the user and sequentially reads out the frames in the moving image data. In the present exemplary embodiment, an example of the input unit is realized by performing the process of step S310.

In step S320, the face detection unit 203 detects the human face pattern (face) from the frames read out in step S310 and outputs the detected result to the face tracing unit 204.

In the present exemplary embodiment, the human face pattern is detected (face detection is performed) at each predetermined frame interval. Further, the present exemplary embodiment describes an example of applying a method for detecting the human face pattern in an image based on a neural network discussed in a reference (Rowley et al, "Neural network-base face detection", IEEE Transactions on pattern analysis and machine intelligence, Vol. 20, No. 1, January 1998).

In the above-described method, the face detection unit 203 cuts out from a frame of the moving image data in which the face is to be detected a predetermined region to be verified against the face image pattern. The face detection unit 203 then performs an operation by inputting a pixel value distribution of the cut out region to the neural network and acquires an output. The face detection unit 203 has previously learned the weight and the threshold value of the neural network based on a large number of face image patterns and non-face image patterns. The face detection unit 203 thus determines that the cut out region is an image of the face if the output of the neural network is greater than or equal to 0, and not an image of the face if the output is other than the above value.

An example of the process performed by the face detection unit 203 will be described in detail below with reference to FIG. 4 which is a schematic diagram illustrating an example of a method for detecting a human face pattern.

Figure 4:
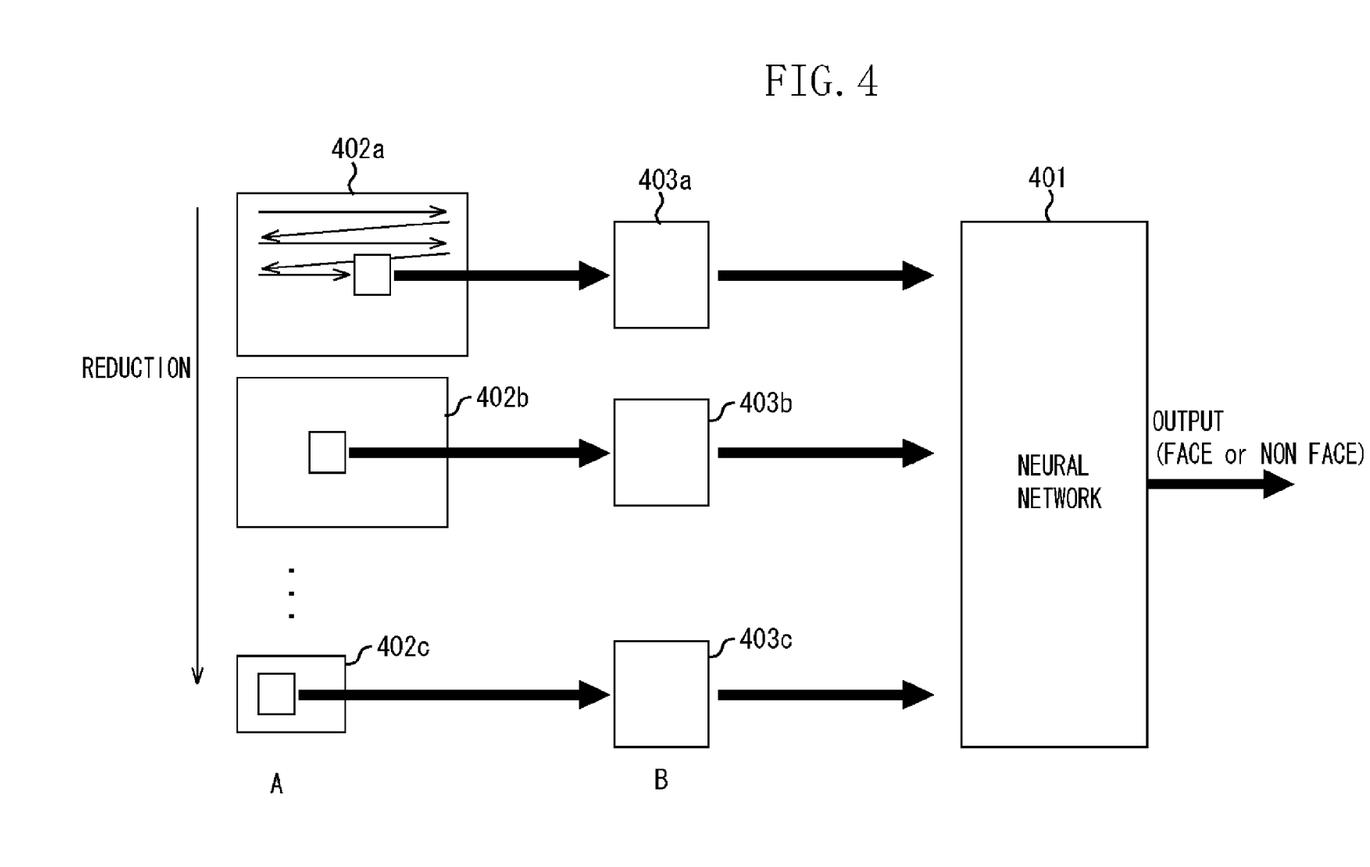
FIG. 4 is a schematic diagram illustrating an example of a method for detecting a human face pattern according to the first exemplary embodiment of the present invention.

Referring to FIG. 4, the face detection unit 203 scans the frame images 402a, 402b, and 402c sequentially from the top line to the bottom line and changes the position to be cut out as the input target region. The cut out region is input to the neural network 401. The face detection unit 203 then extracts the pixel value distribution of the cut out region as patterns 403a, 403b, and 403c to be verified against the face. The face detection unit 203 thus performs calculation by inputting the patterns 403a, 403b, and 403c to the neural network 401. As a result, the face detection unit 203 detects whether the cut out region is a human face pattern (i.e., face).

Further, since the present exemplary embodiment detects various sizes of faces as illustrated in FIG. 4, the detection unit 203 sequentially reduces by a predetermined ratio the size of the frame image 402a in which the face is detected. The face detection unit 203 then scans each of the reduced images 402b and 402c as described above and detects the face.

Figure 5:
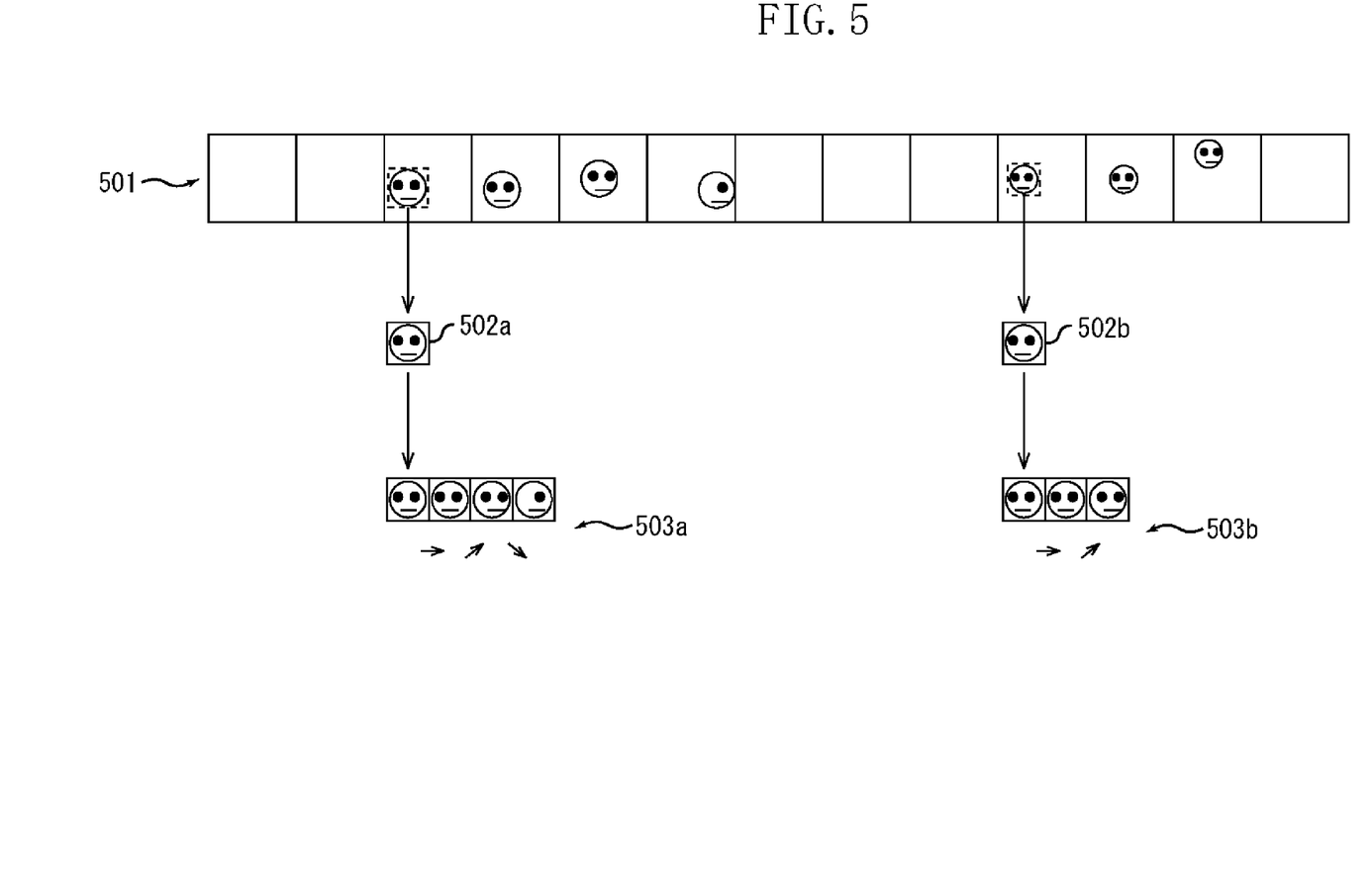
FIG. 5 illustrates an example of the human face pattern detected from frame images in the moving image data and a result of tracing the human face pattern according to the first exemplary embodiment of the present invention.

FIG. 5 illustrates an example of the human face pattern detected from the frame images of the moving image data and the result of tracing the human face pattern.

Referring to FIG. 5, the positions of the face images 502a and 502b in the frames are extracted as a result of the face detection unit 203 detecting the human face pattern for each frame at a predetermined interval in the moving image data 501 as described above.

The method for detecting the face from the images is not limited to using the neural network. For example, various methods discussed in a reference (Yang et al, "Detecting Faces in Images: A Survey", IEEE Transactions on Pattern Analysis and Machine Intelligence, Vol. 24, No. 1, January 2002) can be applied to the present invention.

As described above, an example of the detection unit can be realized by performing the process of step S320.

Returning to FIG. 3, in step S330, the face tracing unit 204 traces the human face pattern detected by the face detection unit 203 in the subsequent frame for each human face pattern. The face tracing unit 204 then outputs to the key face determination unit 206 the face sequence acquired as a result of tracing the human face pattern.

For example, as illustrated in FIG. 5, the face tracing unit 204 traces each of the face images 502a and 502b detected at a predetermined frame interval in the frames subsequent to the frames in which the face images 502a and 502b are detected. As a result, the face tracing unit 204 acquires the motion velocity vector of the face based on the change in the positions of the face images 502a and 502b from the previous frame to the current frame. The face tracing unit 204 then outputs sets of the intervals in which the face images 502a and 502b were traced (i.e., the interval (period) in which the face existed) and the motion velocity vectors of the face acquired from the neighboring frames within the interval. The sets are output as face sequences 503a and 503b.

Figure 6:
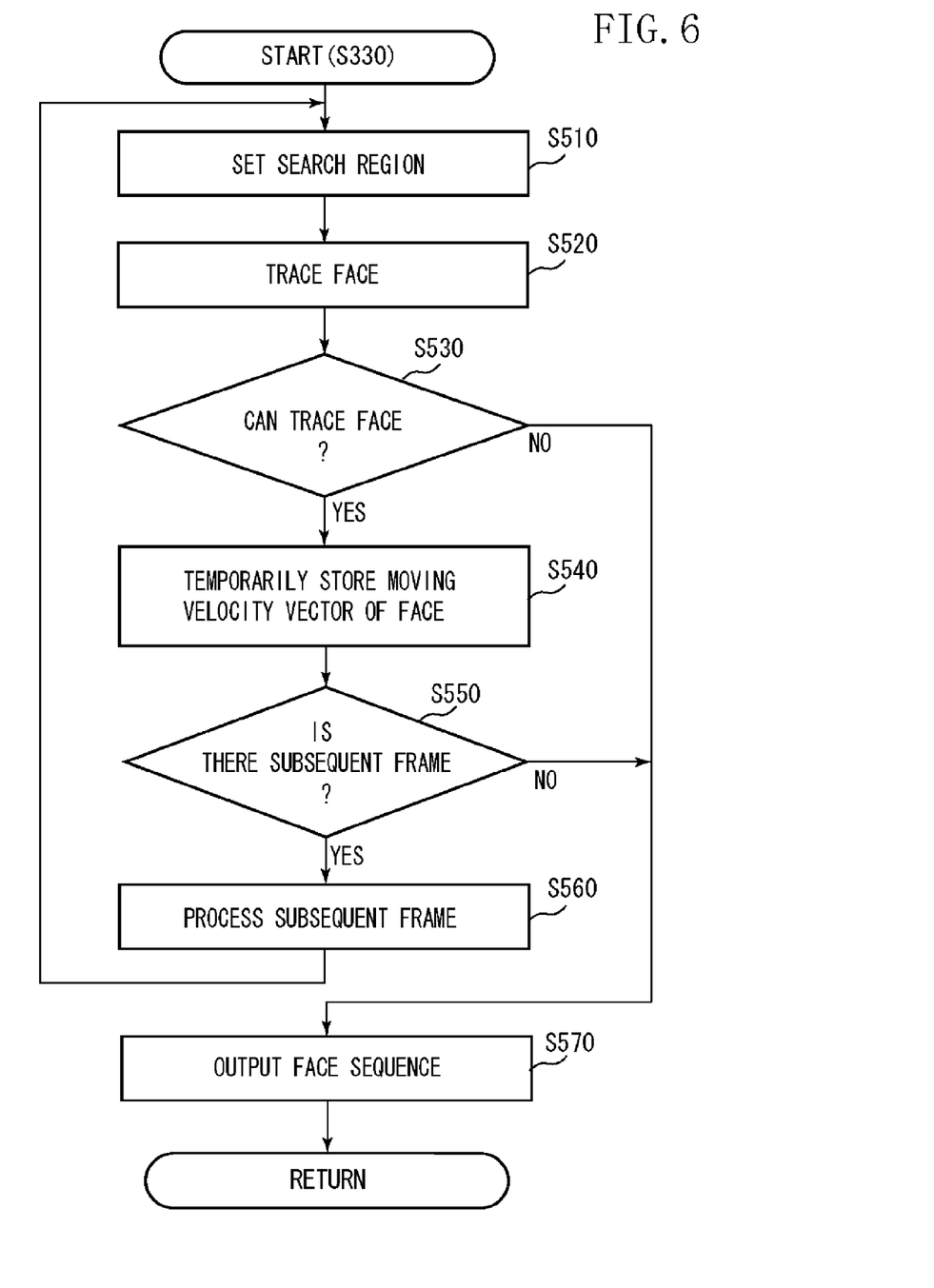
FIG. 6 is a flowchart illustrating in detail an example of a process performed by a face tracing unit according to the first exemplary embodiment of the present invention.

An example of a process performed by the face tracing unit 204 will be described in detail below with reference to the flowchart illustrated in FIG. 6.

In step S510, the face tracing unit 204 sets a search region in the subsequent frame for searching the human face pattern (face images 502a and 502b), based on region information about the human face pattern detected by the face detection unit 203.

When the human face pattern is to be searched for in the frame subsequent to the frame in which the face detection unit 203 detected the human face pattern, the search region is set as described below. The center position of the region of the human face pattern is displaced by a predetermined amount in at least one of a horizontal direction or a perpendicular direction. A rectangular region around such shifted center position is then set as the search region. Further, when the human face pattern is to be searched for in the frame next to the subsequent frame and thereafter, the search region is also set by displacing the region of the human face pattern searched in the previous frame as described above.

In step S520, the face tracing unit 204 traces the human face pattern based on a correlation between the image cut out from the search region and the human face pattern to be searched for. More specifically, the face tracing unit 204 sequentially cuts out the rectangular region of the same size as the search target face pattern around the center position set as the search region. The face tracing unit 204 then calculates a correlation value using as templates the brightness distribution of the image in the rectangular region that is cut out and the brightness distribution of the human face pattern to be searched. The face detection unit 204 then temporarily stores in the RAM 103 the search region having the highest correlation value as the result of tracing the human face pattern, along with the correlation value.

It is not necessary to use the correlation value between the brightness distributions to trace the human face pattern as described above. For example, the correlation between the pixel value distributions for each of R, G, and B pixels can be used. Further, the correlation between feature amounts of the image such as a brightness distribution within the search region or a histogram of the R, G, and B values can be used.

In step S530, the face tracing unit 204 determines whether the correlation value temporarily stored in step S520 is greater than or equal to a predetermined value, to determine whether the human face pattern has been traced.

If the temporarily stored correlation value is greater than or equal to the predetermined value, a degree of similarity between the human face pattern to be searched for and the image in the search region where the correlation is highest is high. It is thus determined that the human face pattern has been correctly traced (YES in step S530). The process then proceeds to step S540.

On the other hand, if the temporarily stored correlation value is less than the predetermined value, the above-described degree of similarity is low. It is thus determined that the human face pattern cannot be traced (NO in step S530), and tracing of the human face pattern is ended. The process then proceeds to step S570.

In step S540, the face tracing unit 204 acquires the motion velocity vector of the face based on the change in the position of the region containing the traced human face pattern. The face tracing unit 204 temporarily stores the acquired motion velocity vector in the RAM 103.

In step S550, the face tracing unit 204 determines whether there is a subsequent frame. If there is no subsequent frame (NO in step S550), the tracing of the human face pattern is ended, and the process proceeds to step S570.

On the other hand, if there is a subsequent frame (YES in step S550), the process proceeds to step S560. In step S560, the face tracing unit 204 shifts the frame in which the human face pattern is to be traced, to the subsequent frame. The process then returns to step S510.

In step S570, after completing tracing of the human face pattern, the face tracing unit 204 outputs a series of the motion velocity vectors of the face temporarily stored in the RAM 103 to the key face determination unit 206. The face tracing unit 204 also outputs information about the interval in which the human face pattern has been traced, to the key face determination unit 206. The series of the motion velocity vectors and the information about the interval are output to the key face determination unit 206 as the face sequences 503a and 503b illustrated in FIG. 5.

The human face pattern is searched for and traced in each subsequent frame for each human face pattern detected by the face detection unit 203 as described above. However, this process may not be necessarily performed. For example, the human face pattern can be searched for and traced in a frame previous to the frame in which the human face is detected, in addition to the subsequent frame. Further, for example, motion vectors can be acquired from the moving image data, and the human face pattern can be traced using the acquired motion vectors as the leads. In such a case, the motion velocity vector of the face can be acquired from a mean value of the motion vectors.

As described above, an example of the tracing unit can be realized by performing the process of step S330.

Returning to FIG. 3, in step S340, the camera operation extraction unit 205 extracts information about the content of the camera operation from the frame images in the moving image data acquired in step S310. As described above, the content of the camera operation includes panning and tilting.

The camera operation information can be extracted, for example, by acquiring a vanishing point of the motion vector using the Hough transform. The vanishing point which acquired the maximum number of votes among the plurality of vanishing points is then set as the vanishing point as to the background, and the constraint expression concerning the camera operation information is solved using such vanishing points to acquire the camera operation information. The relation between the camera operation information and the vanishing point, and methods of acquiring the camera operation information are further discussed in a reference (Kenichi Kanaya, "Gazou Rikai", Morikita Shuppan, May 1990). A velocity vector of the camera operation is a specific example of the camera operation information.

As described above, an example of the extraction unit can be realized by performing the process of step S340.

Further, the above-described process of step S340 can be performed before step S320 or step S330.

In step S350, the key face determination unit 206 determines the face sequence of the key object, based on the face sequence 503 acquired in step S330 (step S570 in FIG. 5) and the camera operation information acquired in step S340.

Figure 7:
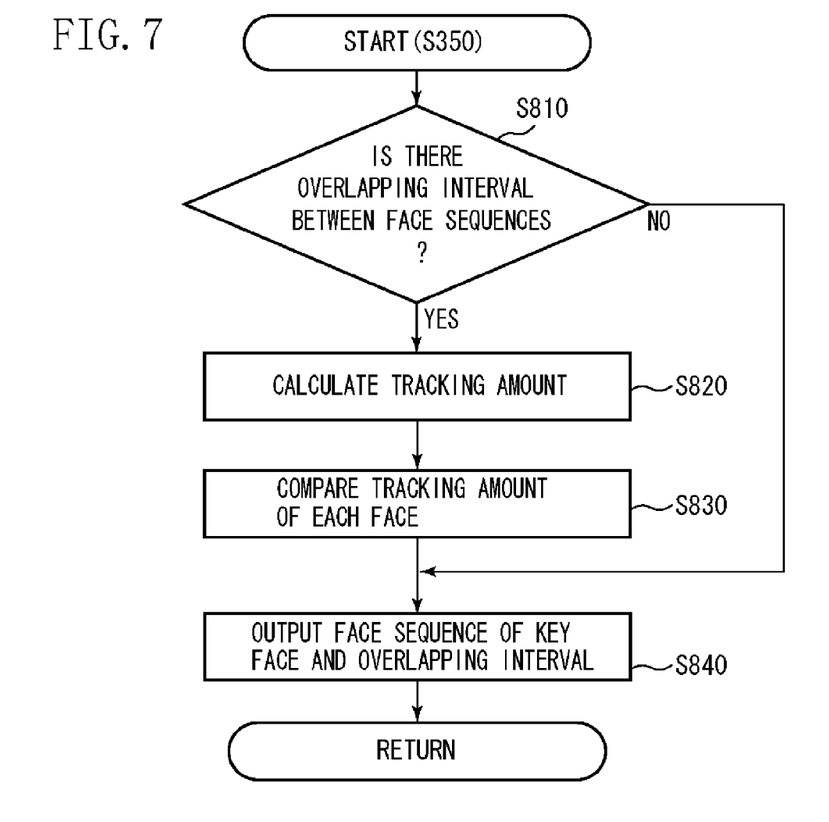
FIG. 7 is a flowchart illustrating in detail an example of a process performed by a key face determination unit according to the first exemplary embodiment of the present invention.

An example of the process performed by the key face determination unit 206 will be described in detail below with reference to FIG. 7.

In step S810, the key face determination unit 206 determines whether there is an interval in which the face sequences 503a and 503b acquired in step S330 overlap in terms of time. If it is determined that there is no interval in which the face sequences 503a and 503b overlap in terms of time (NO in step S810), the process proceeds to step S840.

On the other hand, if there is an interval in which the face sequences 503a and 503b overlap in terms of time (YES in step S810), the process proceeds to step S820.

In step S820, the key face determination unit 206 acquires a tracking amount of each of the face sequences 503a and 503b in the overlapping interval. The tracking amount is a quantitative expression of an amount by which the user tracked the object (the face in the present exemplary embodiment) using the camera operation.

Figure 8:
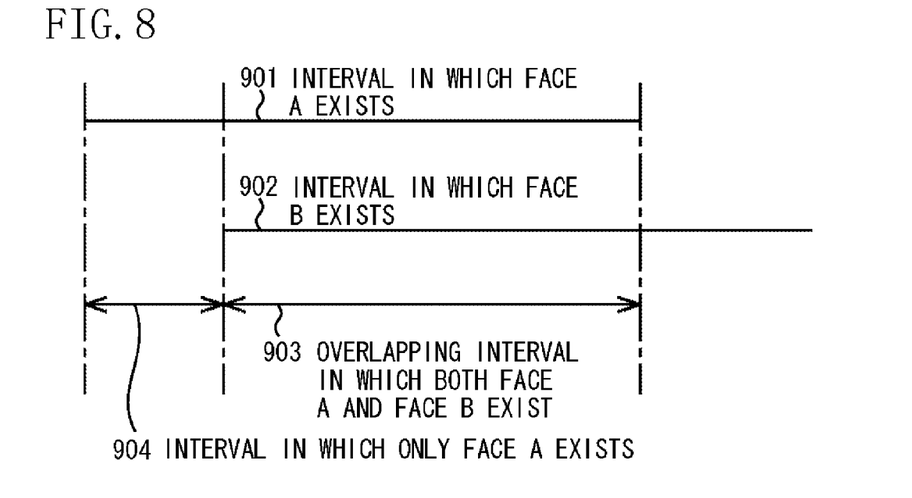
FIG. 8 illustrates an example of an interval in which two faces are present according to the first exemplary embodiment of the present invention.

An example of calculating the tracking amount will be described below. FIG. 8 illustrates an example of the interval in which two faces is present. An example in which the intervals containing two faces overlap as illustrated in FIG. 8 will be described below.

Referring to FIG. 8, an interval 901 contains the face A illustrated in FIGS. 9A and 9B, and an interval 902 contains the face B. Further, there is an overlapping interval 903 in which the interval 901 and the interval 902 overlap, and an interval 904 in which only the face A is present.

Referring to FIG. 9A, motion vectors (motion velocity vectors of the faces) 603 and 604 of the face A and the face B in the frame display 601 will be referred to as $V_a$ and $V_b$ respectively. Further, a velocity vector 602 of a camera operation which is an example of the camera operation information will be referred to as $V_c$. Furthermore, referring to FIG. 9B, a velocity vector 605 of the face A in the real world will be referred to as $V_{ra}$, and a velocity vector 606 of the face B as $V_{rb}$.

When the user operates a camera (i.e., an image capturing apparatus) to track the face A to capture the face A, the speed of the velocity vector 605 (i.e., $V_{ra}$) of the face A in the real world seems to decrease inside the frame display 601. In contrast, the speed of the velocity vector 606 (i.e., $V_{rb}$) of the face B in the real world seems to increase inside the frame display 601. Therefore, it can be determined whether the user operated the camera to track the face A or the face B based on an amount of change generated by tracking the face.

A speed $V_A$ of the face A in the frame display 601, which is a decrease in the speed as a result of operating the camera to track the face A is expressed as in equation 1 described below:

$$V_A = |V_a + V_c| - |V_a| \tag{1}$$

Further, a speed $V_B$ of the face B within the frame display 601, which is decreased as a result of operating the camera to track the face B is similarly expressed by replacing $V_a$ by $V_b$.

When the velocity vector 602 (i.e., $V_c$) of the camera operation is 0, the user is not tracking the face A and the face B using a camera. In such a case, the speed $V_A$ of the face A and the speed $V_B$ of the face B in the frame display 601, which are both decreased as a result of operating the camera to track the face A and the face B, also become 0 according to the above-described equation 1.

The above-described speeds $V_A$ and $V_B$ are tracking amounts for each frame. The key face determination unit 206 thus calculates tracking amounts $V_{AI}$ and $V_{BI}$ by integrating the speeds $V_A$ and $V_B$ with respect to the overlapping intervals 903. More specifically, the key face determination unit 206 calculates the tracking amounts $V_{AI}$ and $V_{BI}$ for each of the face A and the face B using the equations 2 and 3 described below:

$$V_{AI} = \int \{|V_a + V_c| - |V_a|\} dt \tag{2}$$

$$V_{BI} = \int \{|V_b + V_c| - |V_b|\} dt \tag{3}$$

In step S830, the key face determination unit 206 compares the tracking amounts $V_{AI}$ and $V_{BI}$ of the face A and the face B. The key face determination unit 206 then determines the face sequence corresponding to the greater value between the tracking amounts $V_{AI}$ and $V_{BI}$ (or whose value is greater than or equal to a predetermined value) as the face sequence of the key object. If the tracking amounts $V_{AI}$ and $V_{BI}$ of each of the face A and the face B are within a predetermined range, both face sequences corresponding to the face A and the face B are determined to be the face sequence of the key object.

In step S840, the key face determination unit 206 outputs to the representative image extraction unit 207 the face sequence 503 (i.e., the face sequence of the key face) determined in step S830. The key face determination unit 206 also outputs to the representative image extraction unit 207 information related to the overlapping interval 903 corresponding to the face sequence 503. When there is no overlapping interval 903, the process proceeds from step S810 to step S840. In such a case, the key face determination unit 206 outputs to the representative image extraction unit 207 information about the face sequence acquired in step S330 along with the information indicating that there is no overlapping interval 903. The key face determination unit 206 can also indicate that there is no overlapping interval by not outputting information about the overlapping interval.

As described above, according to the present exemplary embodiment, an example of the key object determination unit can be realized by performing the process of step S350.

Returning to FIG. 3, in step S360, the representative image extraction unit 207 extracts the representative image based on the information output from the key face determination unit 206.

More specifically, the representative image extraction unit 207 extracts the representative image based on the face sequence 503 of the face that is the key object and the information about the overlapping interval 903 corresponding to the face sequence 503. For example, in the above-described FIGS. 8 and 9, if the face A is the key object, it is not desirable for the face B to be included in the representative image. The representative image extraction unit 207 thus acquires the interval 904 in which only the face A is present by excluding the overlapping interval 903 from the interval 901 containing the face A. The representative image extraction unit 207 then extracts one or a plurality of frame images in the acquired interval 904 and sets the image or the images as the representative image or images.

If both the face A and the face B are the key objects, it is desirable for the face A and the face B to be captured together in the representative image. The representative image extraction unit 207 thus extracts one or a plurality of the frame images in the overlapping interval 903 in which the interval 901 containing the face A and the interval 902 containing the face B overlap and sets the image or the images as the representative image or images.

Further, if there is no overlapping interval 903, either one of the face A or the face B exists as the key object in each face sequence 503. The representative image extraction unit 207 thus extracts one or a plurality of predetermined frame images in each face sequence 503 and sets the frame image as the representative image.

The frame can be selected from a fixed position in the interval to extract the representative image, such as the head, center, or the end of the interval. However, the method for selecting the frame is not limited to the above.

As described above, according to the present exemplary embodiment, an example of the representative image extraction unit can be realized by performing the process of step S360.

In step S370, the representative image extraction unit 207 stores the index information in the index storing unit 208.

The index information associates the interval to be reproduced (hereinafter referred to as a reproduction target interval as necessary) with the representative image in the interval. For example, in FIG. 8, if only the face A is the key object, the interval 901 in which the face A is present becomes the reproduction target interval. The interval 901 is thus associated with the representative image in the interval 901 and stored in the index storing unit 208.

Further, when the face A and the face B are both the key objects, the interval acquired by an OR operation between the overlapping interval 903 or the interval 901 containing the face A, and the interval 902 containing the face B becomes the reproduction target interval. The reproduction target interval is then associated with the representative image in the interval and stored in the index storing unit 208.

An example of the process performed by the display unit 209 after the index information is acquired will be described below.

Figure 10A:
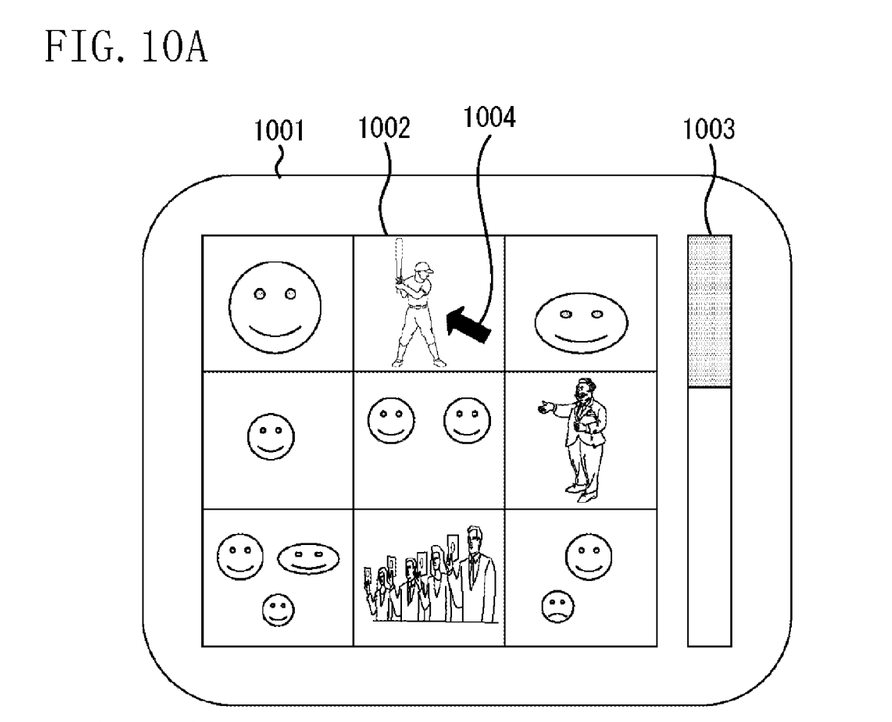
FIGS. 10A and 10B illustrate examples of graphic user interfaces according to the first exemplary embodiment of the present invention.
Figure 10B:
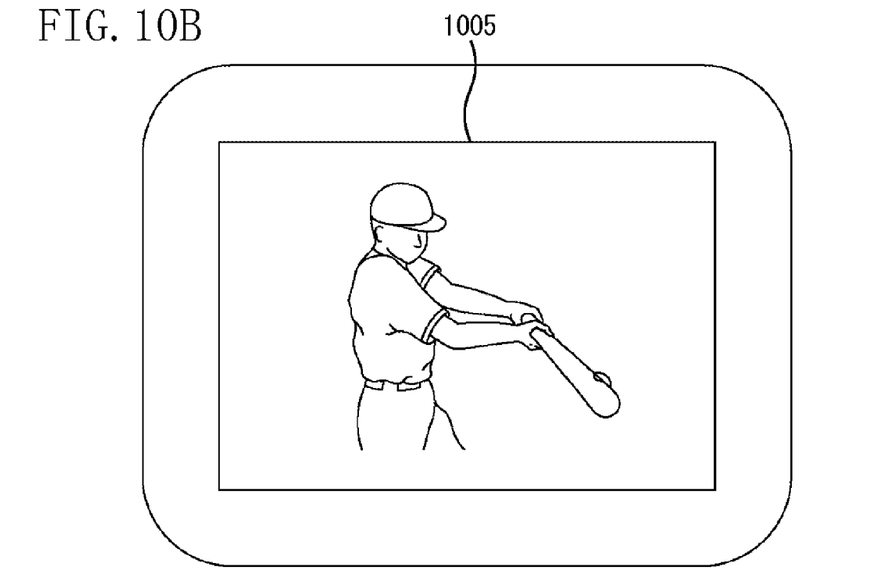

FIGS. 10A and 10B illustrate examples of the graphic user interfaces displayed on the display device 107 by a browser of the display unit 209.

Referring to FIG. 10A, a browser display region 1001 displays a plurality of thumbnail images inside a thumbnail display region 1002, a scroll bar 1003, and a pointer 1004.

The display unit 209 reads the index information from the index storing unit 208. The display unit 209 then reduces the size of the representative image included in the read index information and generates a thumbnail image. The display unit 209 aligns and displays the generated thumbnail image in the thumbnail display region 1002.

In the example illustrated in FIG. 10A, the thumbnail images are displayed in order from the top row and from the left end to the right end. When the user operates the scroll bar 1003, the display unit 209 scrolls the thumbnail images displayed in the thumbnail display region 1002. As a result, the thumbnail images that cannot be displayed on the thumbnail display region 1002 at once are sequentially displayed.

The display unit 209 moves the position of the pointer 1004 according to the user's operation of the mouse 105 and designates the thumbnail image in the thumbnail display region 1002 desired by the user. When the user selects the thumbnail image using the pointer 1004, the display unit 209 refers to the index information corresponding to the selected thumbnail image. The display unit 209 then acquires the reproduction target interval associated with the thumbnail image (i.e., the representative image).

The display unit 209 reads out the moving image that corresponds to the selected thumbnail image from the moving image storing unit 202 and switches the screen from the screen displayed in FIG. 10A to a moving image reproduction screen 1005 illustrated in FIG. 10B. The display unit 209 thus continuously displays the moving image of the acquired reproduction target interval on the moving image reproduction screen 1005.

According to the present exemplary embodiment, an example of a reproduction unit can be realized by performing the process on the display unit 209.

It is not necessary to display the moving image of the reproduction target interval on the moving image reproduction screen 1005 as described above. For example, the user can edit the moving image of the reproduction target interval instead.

As described above, according to the present exemplary embodiment, the human face pattern (face image 502) is detected for each frame at a predetermined interval in the moving image data 501. The face image 502 is then traced using the frame in which the face image is detected and the frame subsequent to the frame in which the face image is detected. As a result, the face sequence is generated that includes the interval in which the face image 502 can be traced, and the motion velocity vector of the face indicating the change in the position of the face image in that interval. Further, the camera operation information indicating the content of the camera operation when acquiring the moving image data 501 is generated from the frame image in the moving image data 501.

The face sequence 503 and the camera operation information are used to determine the face tracked by the user using the camera, and the face determined to be tracked by the user becomes the key object. Therefore, the key object can be automatically and more correctly determined as compared to the conventional method, even if there is a plurality of objects in the frame image that are candidates for the key object.

Further, the reproduction target interval that corresponds to the face determined as the key object (i.e., the face image 502) is determined. The reproduction target interval is determined based on the face sequence 503 of the face determined as the key object and on the overlapping interval 903 in which the face determined as the key object and other faces are displayed together. Therefore, the interval of the moving image in which the key object is captured can be more easily and correctly retrieved.

Furthermore, one representative image is extracted from the interval in which only the key object is present. The thumbnail image of the representative image is then displayed to allow the user to select from the displayed thumbnail images. The interval is thus displayed in a form that is easily selectable by the user, so that reproduction and editing of the images are simplified, and a digest configured of the intervals in which an image of the key object is captured can be automatically generated.

The present exemplary embodiment describes an example in which the motion velocity vector of the face and the velocity vector of the camera operation are acquired in frame units. However, it is not necessary to do so. For example, the motion velocity vector of the face and the velocity vector of the camera operation can be acquired for each predetermined frame. If the moving image is of a Moving Picture Experts Group (MPEG) format, the motion velocity vector of the face and the velocity vector of the camera operation can be acquired in units of group of pictures (GOP). As a result, high-speed processing can be realized.

Further, according to the present exemplary embodiment, the face detection unit 203 detects the face image 502 at a predetermined frame interval, and the face tracing unit 204 traces the region of the detected face image 502 to generate the face sequence 503. However, the face detection unit 203 can also detect the face image 502 for each frame, and the face tracing unit 204 can determine whether the regions of the detected face image 502 sufficiently overlap in the previous frame and the current frame. In such a case, it is desirable for the face detection unit 203 to be able to detect the face facing the side in addition to the face facing the front.

Furthermore, the present exemplary embodiment describes an example in which the content of the camera operation is extracted from the frame images. However, the content of the camera operation can also be acquired from information of a camera sensor or a button operation. Further, information about panning and tilting can be acquired using information detected by a gyro sensor disposed in the camera for image stabilization. In such a case, the camera operation extraction unit 205 is only required to receive the operation information already acquired by the camera.

Moreover, the present exemplary embodiment described an example using the camera operation information to determine the key object. However, if the camera can sufficiently track the key object, the camera operation extraction unit 205 can be omitted, and the key object can be determined only from the motion velocity vectors of the face inside the frame images. If the camera can completely track the key object, the moving velocity of the key object in the frame image becomes 0. Using this fact, the size of the motion velocity vectors of the face inside the frame images are integrated with respect to the overlapping interval 903 for each object. The results of the integration are compared, and the face that corresponds to the result having a smaller value can be determined as the key object.

Further, the present exemplary embodiment describes an example in which the reproduction target interval of the key object and the representative image are extracted and browsed. However, this is not always necessary. For example, only the reproduction target interval of the key object can be acquired, and a digest of the moving image file can be reproduced by connecting the acquired intervals.

The second exemplary embodiment of the present invention will be described below.

There is a case where the motion of the object is too fast that the user cannot track the object, so that the object once goes out of the frame and re-enters the frame. Even in such a case, the result of tracking the object is treated as a continuous face sequence in the present exemplary embodiment.

More specifically, in addition to the first exemplary embodiment, it is determined whether a plurality of face sequences is of an identical object (face). If the plurality of face sequences is of the identical object, the plurality of face sequences is set as a continuous face sequence. Therefore, the portions in the present exemplary embodiment that are similar to the first exemplary embodiments are allocated the identical reference numerals as in FIGS. 1, 2, 3, 4, 5, 6, 7, 8, 9, and 10, and a detailed description will be omitted.

Figure 11:
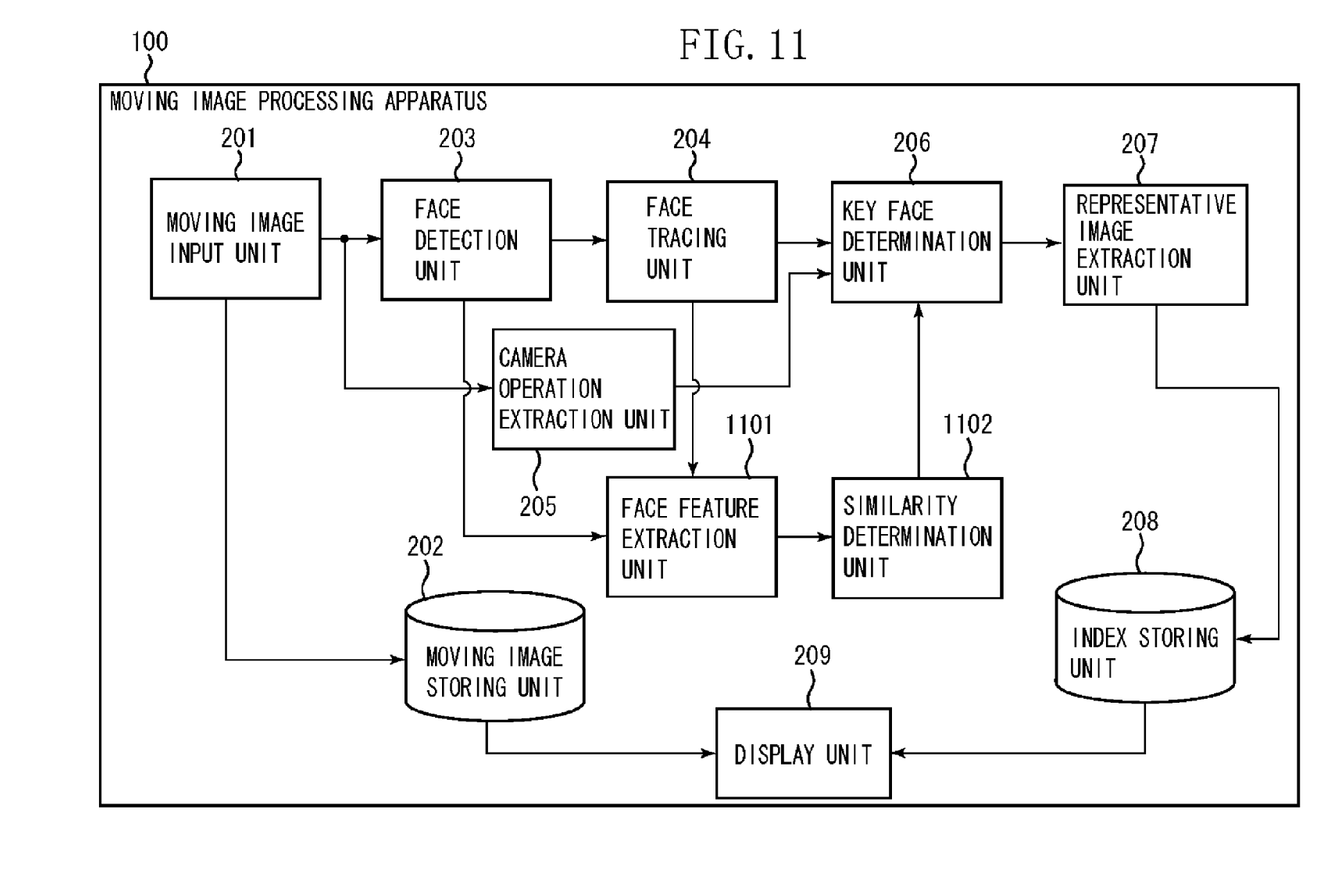
FIG. 11 is a block diagram illustrating an example of a functional configuration of a moving image processing apparatus according to a second exemplary embodiment of the present invention.

FIG. 11 is a block diagram illustrating an example of the functional configuration of a moving image processing apparatus 1100. In the present exemplary embodiment, a face feature extraction unit 1101 and a similarity determination unit 1102 are added to the moving image processing apparatus 100 illustrated in FIG. 2 according to the first exemplary embodiment.

The face feature extraction unit 1101 uses the face image 502 detected by the face detection unit 203 to extract a feature amount of the face representing the face sequence 503. Since the face can be more easily detected when conditions such as lighting on the face or the orientation of the face are favorable, the face image 502 detected by the face detection unit 203 is appropriate as the face image representing the face sequence 503.

The face feature extraction unit 1101 searches for a feature point of the face in the face image 502, which is useful in determining the face. More specifically, the face feature extraction unit 1101 extracts, for example, corners of the eye, both ends of the mouth, or the pinnacle of the nose as the feature points of the face based on pattern verification. The face feature extraction unit 1101 then extracts a local brightness distribution at each extracted feature point as a feature amount using, for example, Gabor wavelet transform, and vectorizes the result.

Details on the method for extracting the feature amount of the face are described in the reference (Wiskott et al, "Face Recognition by Elastic Bunch Graph Matching", IEEE Transactions on Pattern Analysis and Machine Intelligence, Vol. 19, No. 5, may 1997). However, the method is not limited to the above. For example, a local descriptor can be acquired at each feature point as described in a reference (Schmid and Mohr, "Local Greyvalue Invariants for Image Retrieval", IEEE Transactions on Pattern Analysis and Machine Intelligence, Vol. 19, No. 5, may 1997). Further, the feature amount of the face can be more easily extracted using the histogram of the brightness distribution of the face image 502.

The face feature extraction unit 1101 extracts the feature amount of the face representing the face sequence 503 for each face sequence 503. The similarity determination unit 1102 then determines whether a degree of similarity between the feature amounts of the face is greater than or equal to a predetermined value.

The similarity determination unit 1102 determines that a plurality of the face sequences 503 whose degree of similarity is greater than or equal to the predetermined value is of the face of the identical person. On the other hand, the similarity determination unit 1102 determines that the plurality of the face sequences 503 whose degree of similarity is less than the predetermined value is of the faces of different persons. The similarity can be acquired, for example, using a reciprocal of a Euclidean distance between the feature amount vectors.

As described above, according to the present exemplary embodiment, an example of an identical object determination unit is realized by the similarity determination unit 1102, which determines whether the degree of similarity between the feature amounts of the face is greater than or equal to the predetermined value.

The key face determination unit 206 then integrates the plurality of the face sequences 503 determined by the similarity determination unit 1102 as the face of the identical person to acquire an identical face sequence. As a result, the intervals included in the integrated face sequence and the sets of the motion vectors of the face are integrated respectively. The key face determination unit 206 then determines the face sequence of the key object from the plurality of face sequences including the integrated face sequence.

As described above, according to the present exemplary embodiment, an example of a moving image interval integration unit is realized by the key face determination unit 206, which integrates the plurality of face sequences 503 determined by the similarity determination unit 1102 to be the face of the identical person as the identical face sequence.

Figure 12:
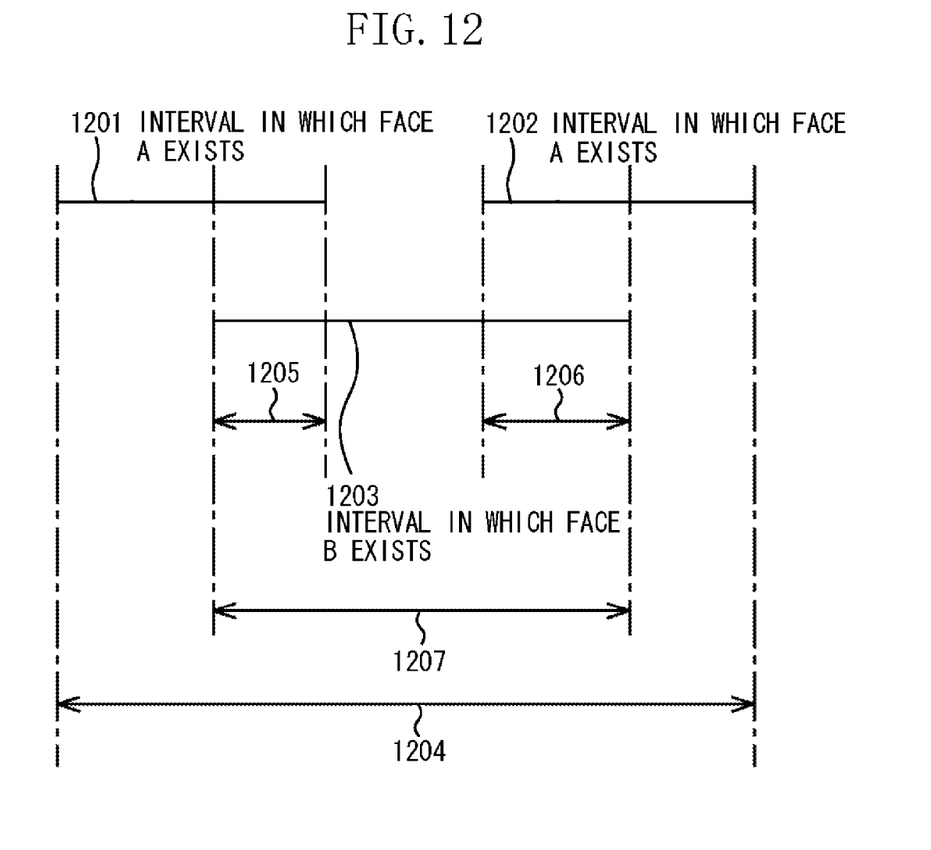
FIG. 12 illustrates an example of an interval in which two faces are present according to the second exemplary embodiment of the present invention.

FIG. 12 illustrates an example of intervals in which two faces are present.

Referring to FIG. 12, since the face A once goes out of the frame and re-enters the frame, intervals 1201 and 1202 in which the face A is present are divided in two. In such a case, the similarity determination unit 1102 determines whether the face sequences 503 corresponding to the intervals 1201 and 1202 are of the face of the identical person.

The key face determination unit 206 then calculates the tracking amount of the face A in overlapping intervals 1205 and 1206 in which both the face A and the face B are present, based on the determination result of the similarity determination unit 1102. The key face determination unit 206 adds the calculated tracking amount. Further, the key face determination unit 206 calculates the tracking amount of the face B in the overlapping intervals 1205 and 1206. The similarity determination unit 1102 then compares the added tracking amount of the face A with the tracking amount of the face B and determines the face sequence of the key object based on the comparison result.

If the face sequence of the face A is determined as the face sequence of the key object, the representative image extraction unit 207 can choose an interval 1204 as the reproduction target interval. Further, if both the face sequences of the face A and the face B are determined as the face sequences of the key object, the representative image extraction unit 207 can choose either of the interval 1204 or an interval 1207 as the reproduction target interval.

As described above, according to the present exemplary embodiment, the plurality of face sequences 503 whose degree of similarity is greater than or equal to the predetermined value is determined as the face of the identical person. Therefore, in addition to the effect described in the first exemplary embodiment, the interval in which the key object is captured can be more precisely retrieved even if the object once goes out of the frame and re-enters the frame.

Further, the key face determination unit 206 can exclude the face sequence 503 of an object which is not the key object from a retrieval target if the face feature extraction unit 1101 and the similarity determination unit 1102 are provided. The face sequence 503 of the object which is not the key object can be excluded even if the face image 502 is the query and the face is to be searched using the feature of the face.

The present exemplary embodiment describes an example in which the plurality of face sequences 503 whose degree of similarity is greater than or equal to the predetermined value is determined as the face of the identical person. However, the method for determining whether the plurality of the face sequences 503 is of the face of the identical person is not limited to the above.

For example, if two intervals are separated within a predetermined time period, the face sequences 503 corresponding to the intervals can be determined as the face of the identical person. Further, if the two intervals are separated within a predetermined time period, the face feature extraction unit 1101 and the similarity determination unit 1102 may be operated. In such a case, if the two intervals are separated not within the predetermined time period, the face sequences that correspond to the two intervals are automatically determined not to be the faces of the identical person.

As described above, according to the exemplary embodiments of the present invention, when intervals in which a plurality of objects is present overlap in the moving image, it is determined whether each object is the key object based on the motion of each of the plurality of objects. As a result, the key object can be more correctly retrieved from the moving image.

The present invention can be realized by executing software (program code) read by a CPU from a computer-readable storage medium. An operating system (OS) or the like working on a computer can also perform a part or the whole of processes according to instructions of the software (program code) and realize the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:
   a memory;
   a processor coupled to the memory which executes the following:
   inputting a moving image;
   detecting at least one object from a moving image input;
   tracing an object detected from a moving image input;
   acquiring a motion of the object and a moving image interval in which the object is present in the moving image based on a tracing result;
   extracting a motion of an image capturing apparatus that captured the moving image;
   calculating, if motions and moving image intervals have been acquired as to a plurality of objects and there is an overlap in the moving image intervals, for each of a plurality of objects in the overlapped interval, a tracking amount by which the image capturing apparatus tracks an object based on motion of each of the plurality of objects and the motion of the image capturing apparatus extracted; and
   determining which of the plurality of objects is a key object by comparing tracking amounts calculated for the plurality of objects.

2. The image processing apparatus according to claim 1, wherein the processor further executes extracting from the moving image a representative image of an object determined to be a key object.

3. The image processing apparatus according to claim 2, wherein in extracting a representative image, the representative image is extracted from moving image intervals in which only an object determined to be a key object is present, among objects detected.

4. The image processing apparatus according to claim 1, wherein the processor further executes extracting a moving image interval in which an object determined to be a key object is present and continuously reproduce a moving image in the extracted moving image interval.

5. An image processing method comprising:
   inputting a moving image;
   detecting at least one object from the moving image;
   tracing an object detected from the moving image;
   acquiring a motion of the object and a moving image interval in which the object is present in the moving image based on a tracing result;
   extracting a motion of an image capturing apparatus that captured the moving image;
   calculating, if motions and moving image intervals have been acquired as to a plurality of objects and there is an overlap in the moving image intervals, for each of a plurality of objects in the overlapped interval, a tracking amount by which the image capturing apparatus tracks an object based on motion of each of the plurality of objects and the motion of the image capturing apparatus; and
   determining which of the plurality of objects is a key object by comparing tracking amounts calculated for the plurality of objects.

6. A non-transitory computer-readable storage medium that store stores a program for instructing a computer to implement an image processing method according to claim 5.

* * * * *